United States Patent
Wik et al.

(10) Patent No.: US 12,396,405 B2
(45) Date of Patent: Aug. 26, 2025

(54) LIGHT INTENSITY CONTROL IN AN ENCLOSED CULTIVATION SPACE

(71) Applicant: HELIOSPECTRA AB (PUBL), Gothenburg (SE)

(72) Inventors: Torsten Wik, Gothenburg (SE); Daniel Bänkestad, Gothenburg (SE); Johan Lindqvist, Gothenburg (SE); Linnéa Ahlman, Gothenburg (SE); Felix Steimle, Stuttgart (DE)

(73) Assignee: Heliospectra AB (publ), Gothenburg (SE)

( * ) Notice: Subject to any disclaimer, the term of this patent is extended or adjusted under 35 U.S.C. 154(b) by 0 days.

(21) Appl. No.: 18/555,251

(22) PCT Filed: Apr. 11, 2022

(86) PCT No.: PCT/EP2022/059647
§ 371 (c)(1),
(2) Date: Oct. 12, 2023

(87) PCT Pub. No.: WO2022/218929
PCT Pub. Date: Oct. 20, 2022

(65) Prior Publication Data
US 2024/0196810 A1     Jun. 20, 2024

(30) Foreign Application Priority Data
Apr. 12, 2021   (EP) .................................... 21167825

(51) Int. Cl.
*A01G 7/04*      (2006.01)
*G01N 21/64*     (2006.01)
(Continued)

(52) U.S. Cl.
CPC ......... *A01G 7/045* (2013.01); *G01N 21/6486* (2013.01); *G01N 2021/635* (2013.01); *G01N 2021/8466* (2013.01)

(58) Field of Classification Search
CPC .... A01G 7/045; A01G 9/249; G01N 21/6486; G01N 2021/635; G01N 2021/8466; G01N 21/64
See application file for complete search history.

(56) References Cited

U.S. PATENT DOCUMENTS 5,854,063 A  * 12/1998  Li ......................... G01J 3/2823
                                                              356/73
11,337,376 B2 *  5/2022  Zhao ...................... A01G 9/023
(Continued)

FOREIGN PATENT DOCUMENTS

CN       110554017 A  * 12/2019
CN       108124755 B     6/2020
(Continued)

OTHER PUBLICATIONS

European Search Report and Written Opinion for Application No. EP21167825 dated Nov. 3, 2021 (5 pages).
(Continued)

*Primary Examiner* — Ebony E Evans
(74) *Attorney, Agent, or Firm* — Barnes & Thornburg LLP (57) ABSTRACT

A method for controlling a light intensity in an enclosed cultivation space, the enclosed cultivation space having a light regulating system including an artificial light source for emitting artificial light, the method comprising, detecting a first fluorescence gain and a second fluorescence gain at different light intensity operating points. If the fluorescence gain is greater when the light intensity is greater, then the light intensity setpoint can be increased. Similarly, if the gain is greater when the intensity is lower, then the setpoint can be reduced.

(Continued)

The invention is based on the understanding that it is beneficial for plant growth to provide light at a level which corresponds to a maximum ChlF-gain. The light level which corresponds to a maximum ChlF-gain provides a good trade-off between production rate and production efficiency.

16 Claims, 6 Drawing Sheets

(51) Int. Cl.
  *G01N 21/63* (2006.01)
  *G01N 21/84* (2006.01)

(56) References Cited

U.S. PATENT DOCUMENTS

| | | | | |
|---|---|---|---|---|
| 2005/0072935 | A1* | 4/2005 | Lussier | G01N 21/6486 250/458.1 |
| 2017/0311553 | A1* | 11/2017 | Dobrinsky | A01G 9/20 |
| 2018/0054975 | A1* | 3/2018 | Shur | G01N 33/0098 |
| 2020/0256841 | A1 | 8/2020 | Urschel et al. | |

FOREIGN PATENT DOCUMENTS

| | | | | |
|---|---|---|---|---|
| DE | 4140414 A1 * | 6/1993 | | A01G 33/00 |
| DE | 10148737 A1 * | 4/2003 | | G01N 21/31 |
| DE | 10148748 A1 * | 4/2003 | | A01B 79/005 |
| DE | 202010002010 U1 * | 6/2010 | | G01N 21/6428 |
| DE | 112011103545 T5 * | 8/2013 | | G01N 21/31 |
| DE | 102014212657 A1 * | 12/2015 | | A01G 7/00 |
| EP | 952441 A1 * | 10/1999 | | G01N 21/6456 |
| EP | 4245124 A1 * | 9/2023 | | G01N 21/31 |
| EP | 4385316 A1 * | 6/2024 | | A01G 7/045 |
| KR | 101584041 B1 * | 1/2016 | | G06F 17/10 |
| KR | 102297913 B1 * | 9/2021 | | G06V 20/188 |
| WO | WO-0113094 A1 * | 2/2001 | | G01N 21/255 |
| WO | WO-2010101460 A1 * | 9/2010 | | G01N 21/6408 |
| WO | WO-2012063455 A1 * | 5/2012 | | A01G 7/00 |
| WO | WO-2014057919 A1 * | 4/2014 | | A01G 1/001 |
| WO | 2016113330 A1 | 7/2016 | | |
| WO | WO-2018056102 A1 * | 3/2018 | | A01G 7/00 |
| WO | 2020010473 A1 | 1/2020 | | |
| WO | WO-2020097596 A1 * | 5/2020 | | A01G 7/045 |
| WO | WO-2020208633 A1 * | 10/2020 | | A01C 21/00 |
| WO | WO-2021099588 A1 * | 5/2021 | | A01G 7/00 |
| WO | WO-2021201634 A1 * | 10/2021 | | A01G 22/00 |
| WO | 2022218929 A1 | 10/2022 | | |

OTHER PUBLICATIONS

International Preliminary Report on Patentability for Application No. PCT/EP2022/059647, issuance Oct. 12, 2023 (12 pages).

* cited by examiner

LIGHT INTENSITY CONTROL IN AN ENCLOSED CULTIVATION SPACE

CROSS-REFERENCE TO RELATED APPLICATIONS

This application is a U.S. national counterpart application of International Application Serial No. PCT/EP2022/059647, filed Apr. 11, 2022, which claims priority to and the benefit of European Patent Application No. 21167825.5, filed Apr. 12, 2021, the contents of each which is incorporated by reference herein in its entirety

FIELD OF THE INVENTION

The present invention relates to control of light intensity in an enclosed cultivation space for plants/crops, the enclosed cultivation space having a light regulating system including an artificial light source for emitting artificial light.

BACKGROUND OF THE INVENTION

Artificial lighting (supplemental or sole-source) in an enclosed cultivation space, such as a greenhouse, typically involves use of a high power artificial lighting system for stimulating and controlling plant growth. Different types of light sources, having different light spectrum, may provide different effects on growth stimulation, which creates a challenge in accurate control of the growth of plants in the cultivation space. Recently, light emitting diodes (LEDs) have become sufficiently bright and cost effective to serve also for artificial lighting in a cultivation space. By using LEDs it is possible to decrease the energy consumption, a requirement that is well in line with the current environmental trend. Additionally, using LED based illumination system minimizes the amount of light source generated heat which is particularly suitable in an environment where temperature control is desirable. By using LEDs of different type (different light emission spectrum), and controlling their individual intensity, the overall light spectrum of emitted light may be controlled. Various approaches have been proposed to ensure an efficient use of such high power lighting systems, and more generally to ensure a desired growth of the plants.

Document WO2016/113330 relates to determination of a growth status of a plant, and is based on detection of fluorescent light emitted from the plant. Specifically, WO2016/113330 discloses applying a modulation to the light emitted by the lighting system, and detecting a change in fluorescence resulting from this modulation. By analyzing the change in fluorescence (gain and phase) the growth status of the plant may be assessed.

Document US2020/0256841 is another example of this approach. This document discloses a fluorometer comprising an LED module configured to emit excitation light towards a plant, and a detector module configured to detect a change in fluorescent light emitted by the plant. The detection of fluorescence gain (ChlF-gain) is used to obtain information about growth characteristics of the plant.

While the teachings of the above documents provide a promising starting point, they do not provide any concrete approach regarding how to implement control of the lighting system.

SUMMARY

It is an object of the present invention to provide an improved control of artificial lighting in a cultivation space, by detecting fluorescence gain of plants. Ultimately, the improved control may lead to increased efficiency in the cultivation of plants. The increased efficiency may be in the form of cost efficiency or improved performance (quality, volume, date of completion, etc.).

According to a first aspect of the invention, this and other objects are achieved by a method for controlling a light intensity in an enclosed cultivation space for plants/crops, the enclosed cultivation space having a light regulating system including an artificial light source for emitting artificial light, the method comprising, at a first operating point at which the light regulation system is operating at a light intensity setpoint, using the light source to at least temporarily cause an increase in intensity of artificial light, detecting an increase in fluorescence light emitted by the plants/crops as a result of the increase in intensity of artificial light, and calculating a first fluorescence gain as the increase in fluorescence light divided by the increase in intensity of artificial light, and then, at a second operating point, at which a light intensity in the cultivation space is different from a light intensity in the first operating point, repeating the process to obtain a second fluorescence gain.

When the light intensity in the second operating point exceeds the light intensity in the first operating point, and the second fluorescence gain is greater than the first fluorescence gain, the light intensity setpoint is increased.

When the light intensity in the second operating point is less than the light intensity in the first operating point, and the second fluorescence gain is greater than the first fluorescence gain, the light intensity setpoint is decreased.

When the light intensity in the second operating point exceeds the light intensity in the first operating point, and the second fluorescence gain is smaller than the first fluorescence gain, the light intensity setpoint is decreased or left unchanged.

When the light intensity in the second operating point is less than the light intensity in the first operating point, and the second fluorescence gain is smaller than the first fluorescence gain, the light intensity setpoint is increased or left unchanged.

According to a second aspect of the present invention, the above object is achieved by a system for light intensity control in an enclosed cultivation space for plants/crops, comprising a light regulating system including an artificial light source for emitting artificial light, a detector for detecting fluorescence light emitted from the plants/crops, and a controller configured to control a light intensity setpoint of the light regulation system by: at a first operating point, at which the light regulation system is operating at a light intensity setpoint, using the light source to at least temporarily cause an increase in intensity of artificial light, detecting an increase in fluorescence light emitted by the plants/crops as a result of the increase in intensity of artificial light, and calculating a first fluorescence gain as the increase in fluorescence light divided by the increase in intensity of artificial light, and then, at a second operating point, at which a light intensity in the cultivation space is different from a light intensity in the first operating point, repeating the process to obtain a second fluorescence gain.

The controller is further configured to increase the light intensity setpoint when the light intensity in the second operating point exceeds the light intensity in the first operating point and the second fluorescence gain is greater than the first fluorescence gain, and to decrease the light intensity setpoint when the light intensity in the second operating point is less than the light intensity in the first operating point and the second fluorescence gain is greater than the first fluorescence gain.

With a control approach according to the present invention, a change in fluorescence gain between two operating points with different light intensity is used to change the light intensity setpoint. If the fluorescence gain is greater when the light intensity is greater, then the setpoint can be increased. Similarly, if the gain is greater when the intensity is lower, then the setpoint can be reduced.

The invention is based on the understanding that it is beneficial for plant growth to provide light at a level which corresponds to a maximum ChlF-gain. In other terms the light level which corresponds to a maximum ChlF-gain provides a good trade-off between production rate and production efficiency. Above this level of light, the marginal benefit on photosynthesis by adding additional light intensity declines more rapidly, and is clearly less efficient. A setpoint control according to the invention will adjust the setpoint towards the light level where ChlF-gain has its maximum, and thus before the marginal benefit of additional light has started to decline considerably.

In a closed cultivation space, where all light originates from the artificial light source (termed sole-source lighting), it is easy to establish if the light intensity has increased or decreased.

In a cultivation space allowing also an influx of natural light, the actual (total) light intensity may be measured with an appropriate sensor for each of the operating points. The size of measured changes can be used to improve the light control. However, it is noted that such light intensity detection is not necessary for implementing the present invention. In fact, it is sufficient to know if the light intensity has increased or decreased between the two operating points, and such knowledge may be obtained also without measuring the actual (total) light intensity. For example, a light intensity increase can be secured using the light source at a time of day when natural light can be expected to be stable and/or predictable, For example, the natural light can be expected to be very low or non-existing at night time. Similarly, the light source may be kept constant at a time of day when natural light can be expected to increase or decrease (e.g. dawn or dusk).

In a cultivation space allowing influx of natural light, the light regulating system may further comprise controllable light blocking means, such as movable curtains or the like. In this case, the setpoint may be a combined setpoint, including a first setting for the light source and a second setting for the light blocking means. It is understood that an "increase" or "decrease" of the light intensity setpoint in this case may be effected by a change in one or both of these settings. For example, an increase in light intensity setpoint may be effected as an increase of the light source setting (more artificial light) or an increase of the light blocking means setting (larger opening—more natural light).

The light intensity control according to the present invention may be used in combination with other lighting control strategies, such as DLI control and constant light intensity control. When DLI control is applied, the lighting system is configured to measure and control the total amount of light that the plants are exposed to over a day (the "daily light integral", or DLI). A day (24 h) is an intuitive time interval (circadian rhythm), but the time interval can in principle be changed, such as weekly light integral. DLI control is used to control production rate, improve consistency, ensure product quality and realize cost savings for supplemental lighting by avoiding excess lamp use. In a DLI controller, lamp use is controlled based on DLI target and sunlight prediction, but also taking other factors into account, such as electricity prices. It is also preferable to avoid too high light intensities, which would risk stressing the plants.

Some aspects of the present invention may be used in a DLI controller to ensure that the light intensity does not exceed the optimal operating point as defined by the ChlF-gain curve.

Constant light intensity control basically maintains a constant light level. Here, some aspects of the present invention may be used to find a suitable target light intensity, as this may be related to the ChlF-gain curve.

In both cases, i.e. DLI and On Target control combined with aspects of the present invention, the different objectives of the control functions may result in contrasting lamp use settings, meaning that one of the control strategies needs to be given precedence.

The step of at least temporarily increasing the light intensity of the artificial light may involve increasing light intensity in a specific wavelength range, wherein light in this specific wavelength range does not cause reflections in the wavelength range of the detected fluorescence. In other words, the light increase used to trigger the fluorescence gain will not cause reflections which interfere with the fluorescence detection.

Further, the step of at least temporarily increasing the light intensity of the artificial light may involve adding a periodic modulation component to the artificial light, thereby causing a periodic change in fluorescence emitted by the plants/crops. Introducing such a light intensity modulation to determine fluorescence gain is known in the art, and has certain advantages compared to making one single step in light intensity.

The steps of detecting first and second fluorescence gains and increasing or decreasing the light intensity setpoint may be repeated, to thereby ensure a light intensity in the cultivation space at which the fluorescence gain is at a maximum value. This type of control scheme, where one value (here: light intensity) is controlled so as to ensure a maximum in another value (here: fluorescence gain) is sometimes referred to as "extreme seeking control", ESC.

By storing previous values of a fluorescence gain maximum (i.e. the maximum obtainable fluorescence), and observe if this changes over time (e.g. during the course of a day, or from day to day) it may be possible to assess a growth status of the plants/crops, and to modify at least one of a set of controllable cultivation parameters based on this growth status assessment.

Further, by also storing previous values of measured light intensity when the fluorescence gain is at its maximum, (e.g. during the course of a day, or from day to day) it may be possible to assess a growth status of the plants/crops, and to modify at least one of a set of controllable cultivation parameters based on this growth status assessment. The growth status can include current stage of the growth cycle, level of light assimilation, level of stress, etc. For example, a falling light intensity (i.e. a ChlF-gain maximum at a lower light intensity level) may indicate stress caused by draught.

It is noted that data from a light intensity control system according to the present invention may be stored in connection to other relevant data, such as growth cycle statistics, to even further improve the growth status assessment.

The controllable cultivation parameters may include e.g. water supply, fertilizer supply, $CO_2$ supply, humidity and temperature.

In some situations, it may be decided to offset the desired light intensity with respect to the maximum ChlF-gain. In other words, it may be desired to intentionally avoid a light intensity leading to a maximum ChlF-gain, and instead have a light intensity below or above this level. Such offset may be adequate in situations where other factors relating to operational efficiency are considered, such as market demand and cost of electricity. The offset can be achieved by simply adding a suitable offset when comparing the first and second ChlF-gains, or by multiplying the first and/or second ChlF-gains by a suitable factor before the comparison. One reason for such an offset could be an underlying DLI control as mentioned above. In order to ensure the required DLI, it may be necessary to temporarily deviate from the ChlF-gain maximum and provide more light. And conversely, if the required DLI is approaching, it may be necessary to temporarily deviate from the ChlF-gain maximum and provide less light.

BRIEF DESCRIPTION OF THE DRAWINGS

The present invention will be described in more detail with reference to the appended drawings, showing currently preferred embodiments of the invention.

DETAILED DESCRIPTION

Chlorophyll fluorescence is a process in all green plants (i.e. including chlorophyll) in which light incident on the plant is absorbed by chlorophyll molecules and re-emitted in the red and far-red regions of the spectrum. The chlorophyll fluorescence spectrum at room temperature is around 650 to 780 nanometers, with distinct peaks at around 685 nm and 720-740 nm. Such light is often simply referred to as fluorescence light. An increase in light incident on the plant will result in a corresponding increase in chlorophyll fluorescence, and thus an increase of emitted fluorescence light. The relationship between increase of incident light and increase in detected fluorescence light is referred to as chlorophyll fluorescence gain, or ChlF-gain. The present invention involves detection, or measurement, of ChlF-gain in various operating points, i.e. various lighting conditions.

Figure 1:
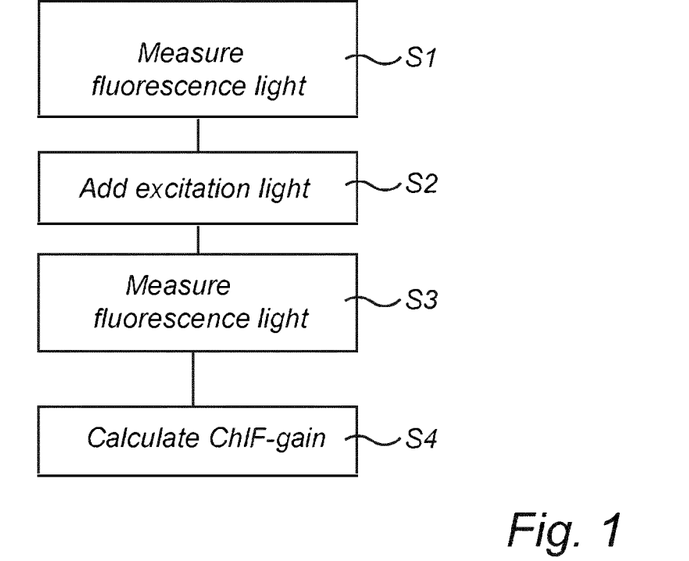
FIG. 1 is a flow chart of a process for detecting ChlF-gain.

In a very simple approach, fluorescence gain may be detected according to the process illustrated in FIG. 1. First (step S1), initial fluorescence light $E_{fl}(init)$ is detected. Then (step S2), light incident on the plant is modified by adding excitation light, $E_{ex}$, typically using an artificial light source, and then (step S3) the excited fluorescence light $E_{fl}(ex)$ is measured. The ChlF-gain is calculated as the difference between $E_{fl}(ex)$ and $E_{fl}(init)$ divided by the amount of excitation light, $E_{ex}$.

It is noted that the excitation light, $E_{ex}$, preferably has a spectral distribution in a range which does not cause reflections in the fluorescence wavelength range. For example, blue light may be used.

Further, it is noted that in some embodiment, the excitation light $E_{ex}$ may be held constant. In this case, the division by the excitation light is only a constant factor, which may be disregarded. For the purpose of incident light control discussed herein, it may then be sufficient to determine ChlF-gain as a difference between $E_{fl}(ex)$ and $E_{fl}(init)$.

In a more elaborate, and more robust, process, the excitation light is added in the form of a periodic modulation of artificial light. The modulation may for example be sawtooth, square or short pulse, or sinusoidal. The modulation will cause a corresponding modulation of the emitted fluorescence light, and the ChlF-gain may be determined by comparing the amplitudes of the two periodic signals. More details about ChlF-gain detection can be found in WO2016/113330, hereby incorporated by reference.

Figure 7:
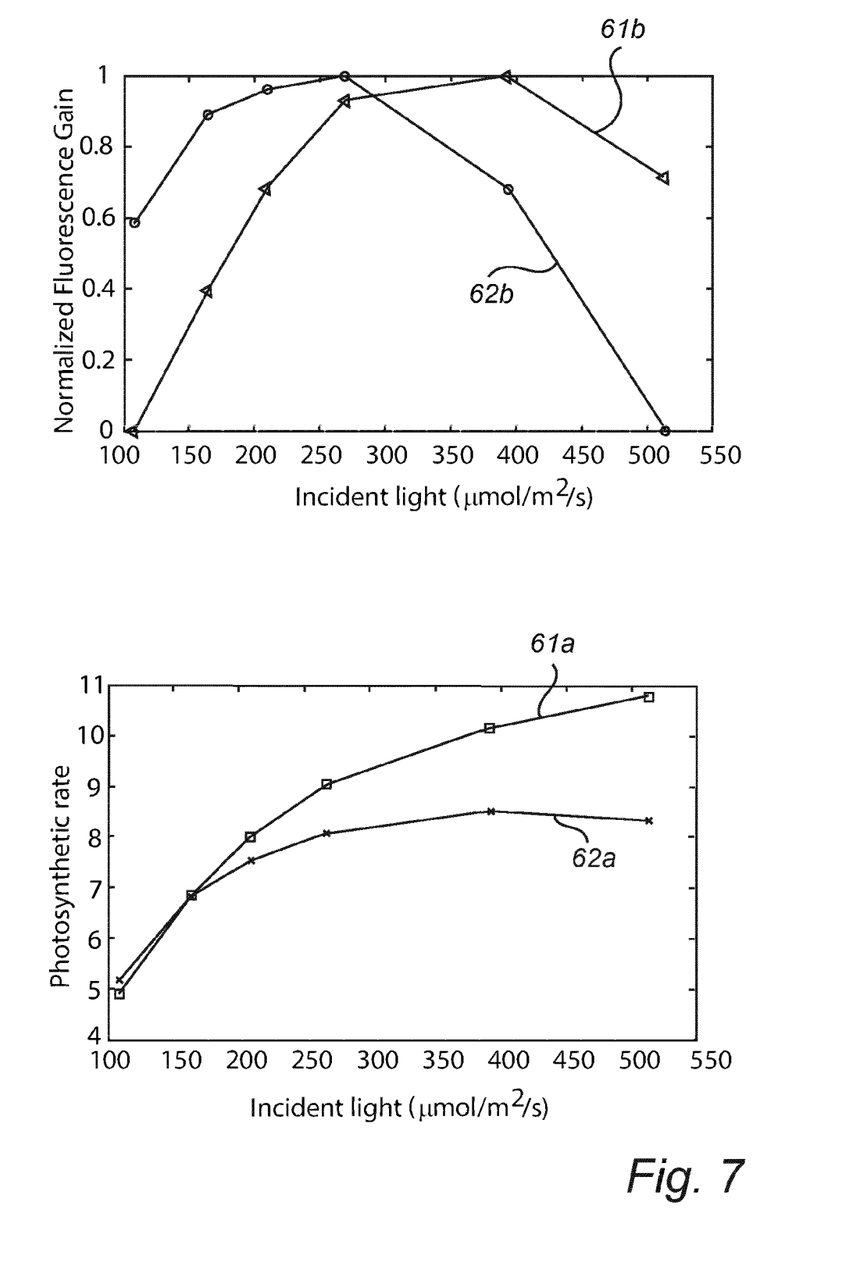
FIG. 7 shows diagrams of ChlF-gain and photosynthesis as functions of light intensity for lettuce in dry and wet soil.

FIG. 7 shows ChlF-gain (upper diagram) and photosynthetic rate (lower diagram) as function of light intensity for lettuce in dry and wet soil respectively. Curves 61a and 61b relate to the lettuce in wet soil, while curves 62a and 62b relate to the lettuce in dry soil (i.e. the lettuce plant is stressed).

The photosynthesis rate 61a of the wet, non-stressed plant increases with increasing light intensity, first rapidly and then more slowly. The ChlF gain 61b of the same plant has a maximum at around 400 $\mu mol/m^2/s$, which corresponds to a point on the photosynthesis curve 61a where the rate increases relatively slowly. This light intensity level may therefore be considered as an appropriate trade-off between photosynthesis rate (production) and photosynthetic efficiency (productivity).

The photosynthesis rate 62a for the dry, stressed plant, also increases with increasing light intensity at first, but then evens out and eventually declines. The ChlF gain 62b of the same plant has a maximum at around 270 $\mu mol/m^2/s$, which again corresponds to a point where the photosynthesis rate increases relatively slowly.

From FIG. 7 it is clear that it may be advantageous to control the light intensity in a cultivation space to a level which corresponds to a maximum in the ChlF-gain curve. FIG. 7 also illustrates that in a system according to the present invention, where light intensity is controlled to correspond to a maximum in the ChlF-gain curve, a decrease in optimal light intensity may be taken as an indication that the plant is in a stressed state.

Figure 2:
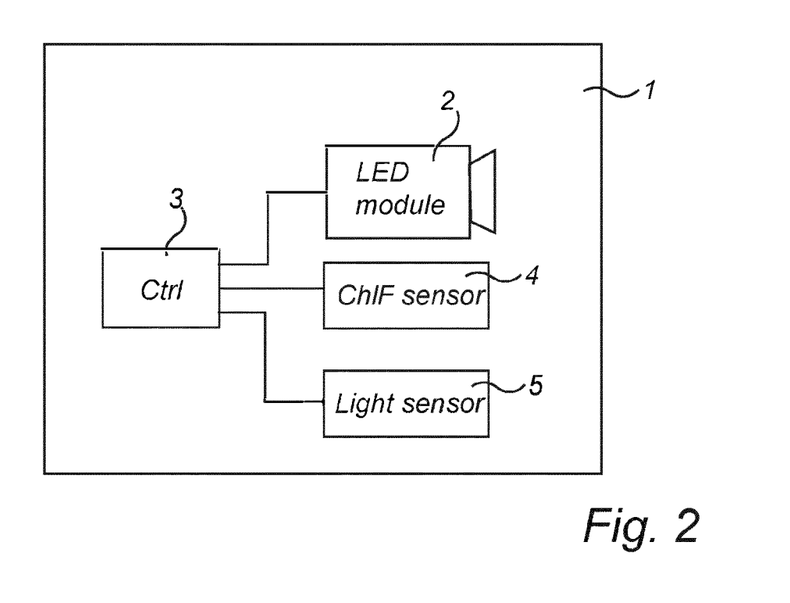
FIG. 2 is a schematic block diagram of an illumination device according to an embodiment of the invention.

FIG. 2 shows an illumination device 1 which is configured to implement the present invention. For this purpose, the device has a LED module 2 including a plurality of LEDs and associated driver circuitry, and a controller 3 connected to control the driver circuitry of the LED module. The device 1 is further provided with a fluorescence detector 4, and optionally also a light intensity detector 5.

The LED module 2 typically comprises LEDs emitting a number of primary colors, for example the three primaries red, green and blue. The light spectrum of the generated light is determined by the colors of the LEDs that are used, as well as by the mixing ratios of the intensities of light from LEDs of different colors. An example of an LED based illumination system is disclosed in WO2008/118080, herewith incorporated by reference.

The frequency spectrum and intensity of the light emitted by the LED module 2 is determined by a frequency spectrum setpoint and a light intensity setpoint provided by the controller. For example, the light intensity setpoint may be a percentage of full power, while the frequency spectrum setpoint may indicate a relative distribution of this light intensity over a relevant wavelength range. Alternatively, both spectrum and intensity can be controlled by one setpoint in the form of a intensity/frequency profile. Various other approaches are also possible.

The controller 3 is configured to perform a detection of fluorescence gain using the fluorescence detector 4 e.g. according to the process described with reference to FIG. 1. In principle, the fluorescence detector 4 may be connected to the LED module 2, which then may provide the excitation light. However, it may be advantageous to provide a separate light source for emitting the excitation light $E_{ex}$. Such a separate light source may be integrated in the fluorescence detector 4, and configured to only emit light in a limited wavelength range (e.g. blue light) and also be adapted to emit a periodically modulated light.

Figure 3:
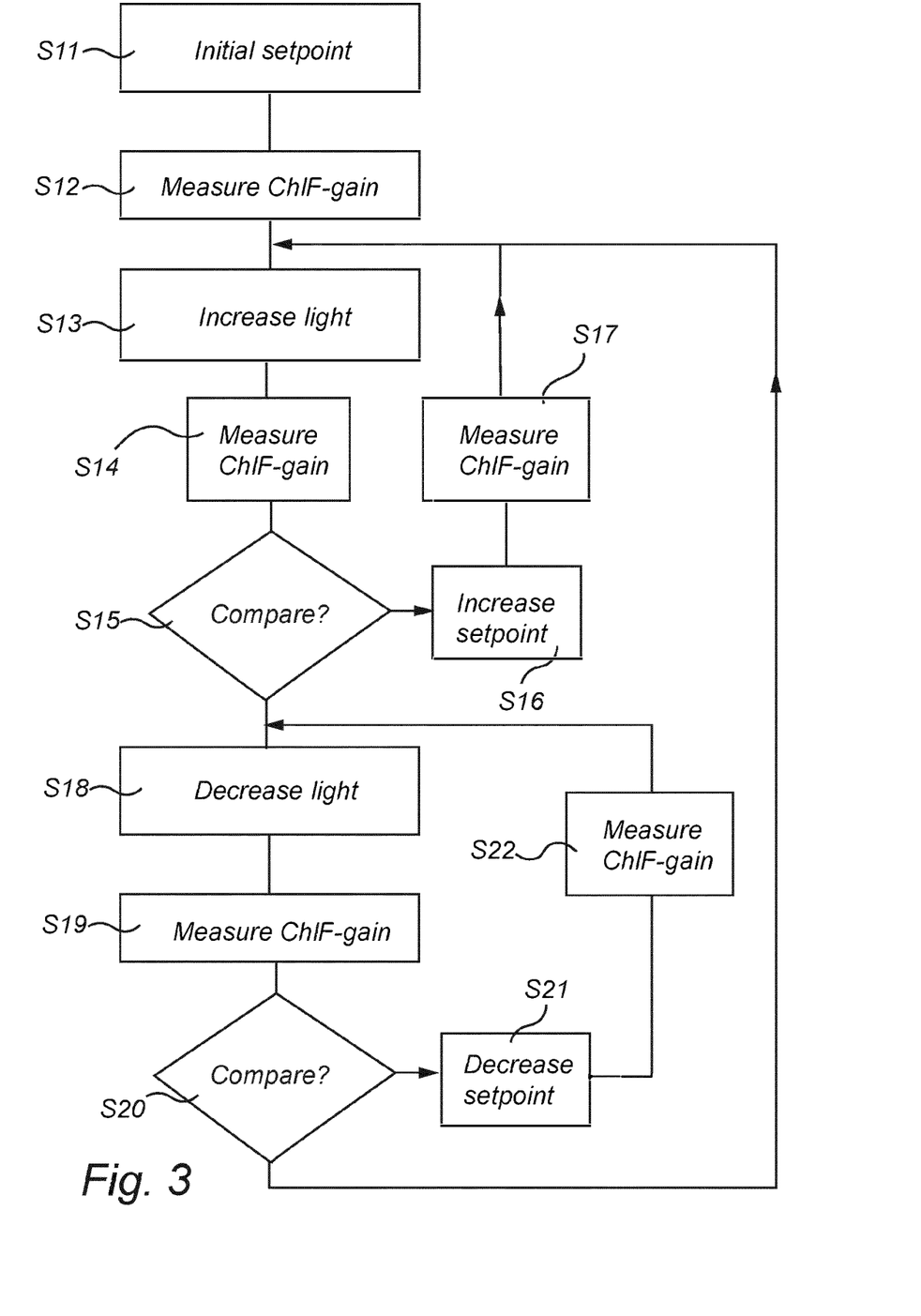
FIG. 3 is a flow chart of a process according to an embodiment of the invention.

According to one embodiment of the invention, the controller 3 is configured to implement a light intensity control scheme according to the flow chart in FIG. 3.

In step S11, an initial light intensity setpoint is established, e.g. at 50% of maximum power, and the LED module 2 is controlled to emit light according to this setpoint. In step S12, a first fluorescence gain, ChlF-gain$_1$, is detected using the detector 4. In step S13, the LED module 2 is controlled to emit light with a light intensity greater than the setpoint, so that the system is brought to a different operating point, and in step S14 a second ChlF-gain, ChlF-gain$_2$, is measured. In step S15, ChlF-gain$_1$ and ChlF-gain$_2$ are compared with each other. If ChlF-gain$_2$ is greater than ChlF-gain then the setpoint will be increased in step S16, a new ChlF gain$_1$ is measured in step S17, and the process returns to step S13. This cycle will be repeated as long as the light increase in step S13 results in an increase in ChlF-gain. If, on the other hand, the comparison in step S15 indicates a decrease in ChlF-gain (i.e. ChlF-gain$_2$ is smaller than ChlF-gain$_1$) then the setpoint will be left unchanged, and the process continues to step S18.

In step S18, the LED module 2 is controlled to emit light with a light intensity lower than the setpoint, and in step S18 another ChlF-gain, ChlF-gain$_3$, is measured. In step S20, ChlF-gain$_1$ and ChlF-gain$_3$ are compared with each other. If ChlF-gain$_3$ is greater than ChlF-gain$_1$ then the setpoint will be decreased in step S21, a new ChlF gain$_1$ is measured in step S22, and the process returns to step S18. This cycle will be repeated as long as the light decrease in step S18 results in an increase in ChlF-gain. If, on the other hand the comparison in step S20 indicates a decrease in ChlF-gain (i.e. ChlF-gain$_3$ is smaller than ChlF-gain$_1$) then the setpoint will be left unchanged, and the process returns to step S13.

It is noted that the initial setpoint in step S11 may be zero. In this case, the process in FIG. 3 will (in theory at least) lead to a monotone up-ramping of the setpoint until the ChlF-gain reaches its maximum.

In FIG. 3, the first cycle (steps S13-S17) involves a light increase, while the second cycle (steps S18-S22) involves a light decrease. Of course, the order of these cycles may be reversed.

According to another embodiment, the controller is configured to introduce a slow periodic modulation, so that the LED module continuously emits light with an intensity slowly varying up and down around the currently determined setpoint. The modulation may e.g. be a saw tooth or a sine wave, with a period in the order of minutes. This modulation will provide an increase and decrease of light intensity corresponding to steps S13 and S17 in FIG. 3. The fluorescence gain is measured in the same way as discussed above, at suitable points along the modulation curve, such that these measurements correspond to the measurements in steps S14 and S18 in FIG. 1.

Figure 4:
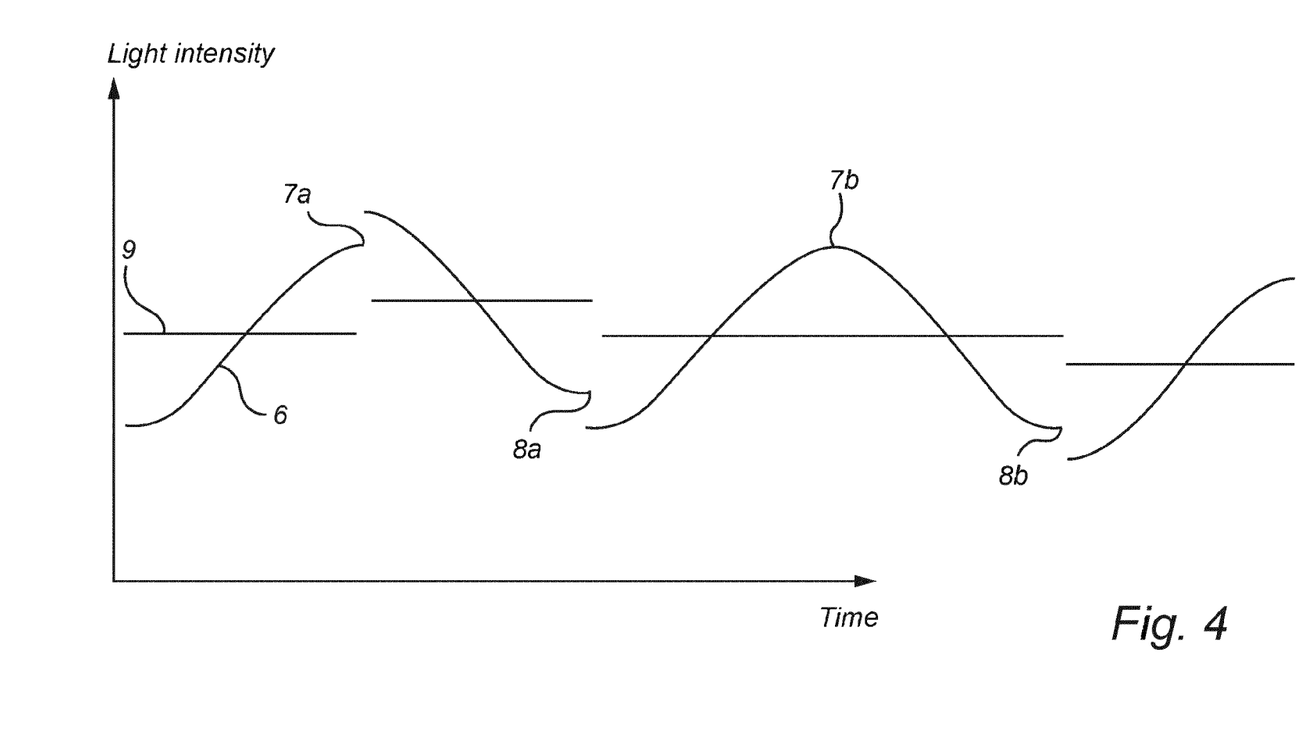
FIG. 4 is a diagram showing modulation of emitted light and changes of the light intensity setpoint according to an embodiment of the invention.

FIG. 4 shows an example where the light intensity is modulated by a sinus wave 6 around the setpoint 9. The fluorescence gain is measured at appropriate points in time, e.g. in each peak 7a, 7b and each dip 8a, 8b of the sine period. At the first peak 7a, the ChlF-gain is found to have increased, and as a result the setpoint 9 is increased by a selected amount. In the following dip 8a, the ChlF-gain is again found to have increased, resulting in a decrease of the setpoint 9. In the following peak 7b, the ChlF-gain is found NOT to have increased, and the setpoint is therefore left unchanged. In the next dip 8b, finally, the ChlF-gain is again found to have increased, and the setpoint is again reduced.

The control scheme discussed above will ensure that the light intensity setpoint eventually reaches a value corresponding to a light intensity level at which the fluorescence gain is at its maximum. As soon as an increase or decrease in light intensity results in an increase in ChlF-gain, the setpoint will be changed. Such control is referred to as "extreme seeking control", ESC, which in general terms controls the manipulated variable (light intensity) to a value corresponding to a maximum of another variable (ChlF-gain).

In order to avoid a constantly fluctuating setpoint, the process may include appropriate hysteresis or filtering, such as moving average, in order to make the setpoint changes more robust.

In an alternative approach, the light increase/decrease to shift to a new operating point is achieved by changing the light intensity setpoint. After a first initial setpoint increase, the effect on ChlF-gain is measured. In case of increase the setpoint is again increased, and in case of a decrease the setpoint is decreased. Then a new ChlF-gain measurement is performed. With this approach, the setpoint will always fluctuate around the level corresponding to the ChlF-gain maximum. The step change implemented is therefore preferably rather small. Also, it may be advantageous to implement a hysteresis in the process, to avoid unnecessary light variations.

Without a light intensity sensor 5, the illumination device I will operate without knowledge of the overall light intensity in the cultivation space. However, thanks to the feedback provided by the fluorescence light measurements, the device will still (as far as possible) ensure a light intensity which maximizes the fluorescence gain. For example, if an influx from other light sources, e.g. natural light from the sun, changes, the fluorescence gain will also change and cause an adjustment of the light intensity setpoint. For a brief period, changes in surrounding light may interfere with the control scheme and temporarily cause divergence from the maximum ChlF-gain. For example, when the light emitted by the LED module is changed in one direction, the overall light intensity may, due to a change in incident sunlight, change in the opposite direction, thereby resulting in an incorrect adjustment in step S12 or S20. However, as long as the dynamics of average overall light are slow, the control scheme will soon return the cultivation space to a light intensity level ensuring a maximum ChlF-gain.

If the illumination device is equipped with a light intensity sensor 5, the control scheme becomes even more robust. Now, the controller can verify that the overall light intensity incident on the plant has in fact increased (or decreased) for a subsequent ChlF-gain measurement.

Figure 5:
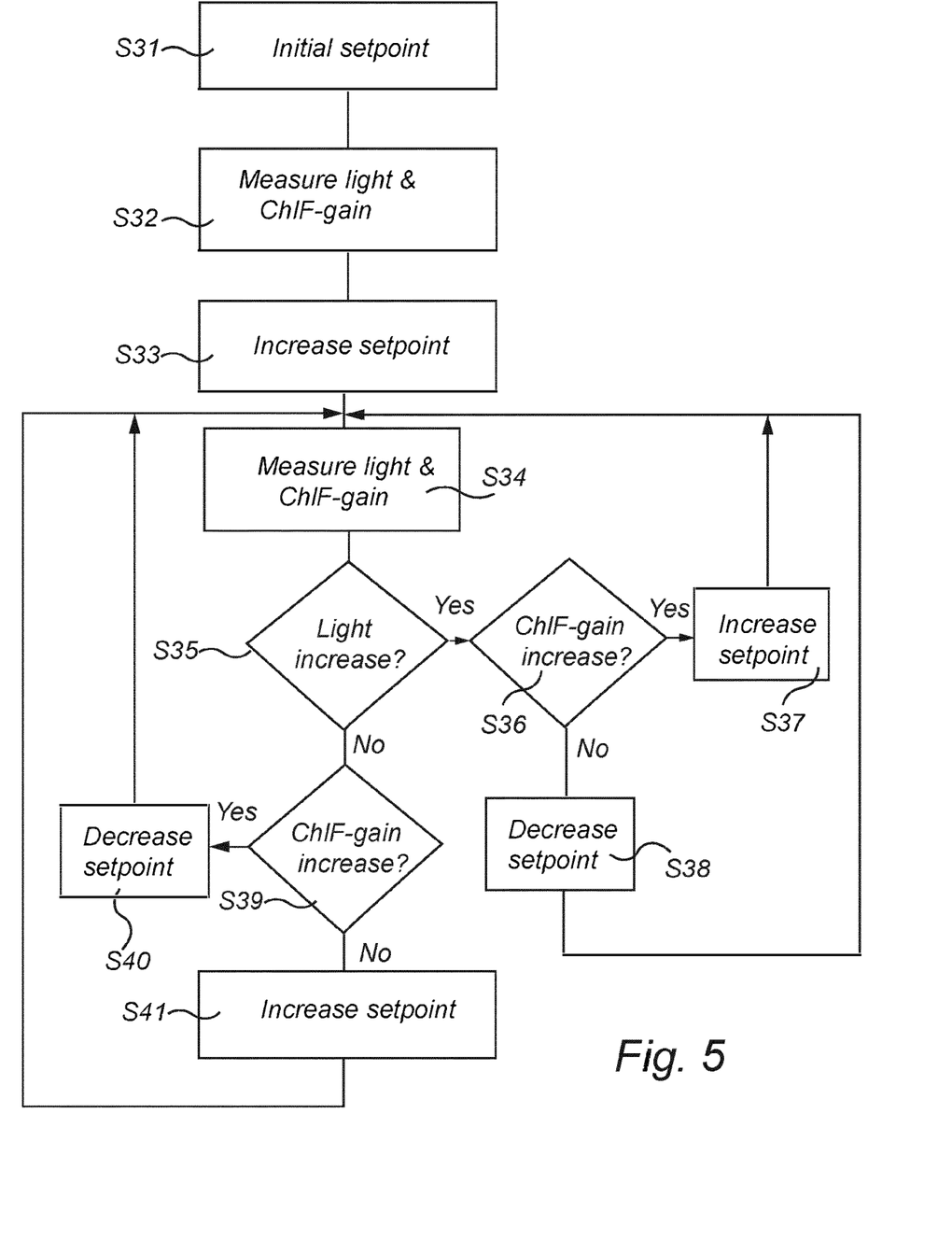
FIG. 5 is a flow chart of a process according to another embodiment of the invention.

One embodiment of a process with a system equipped with the light intensity detector 5 is shown in FIG. 5. In this embodiment, an initial setpoint is applied in step S31, and the light intensity and ChlF-gain are measured in step S32 for the initial operating point. Then, in step S33, the setpoint is increased (or decreased, it does not matter), and light and ChlF-gain are again measured in step S34, i.e. in a new operating point.

In step S35, it is determined if the incident light has increased. Note that even if the setpoint was increased in step S33, incident light may have decreased, e.g. in case of an overcast sky. If there has been an increase in incident light, the process moves to step S36, where it is determined if the ChlF-gain has increased. If "yes", then the setpoint is increased in step S37. If "no", then the setpoint is decreased in step S38. If, on the other hand, there has been a decrease in incident light, then the process moves to step S39, where it is determined if the ChlF-gain has increased. If "yes", then the setpoint is decreased in step S40. If "no", then the setpoint is increased in step S41. After the setpoint increase/decrease, the process returns to step S34 for a new measurement (in a new operating point).

The illumination device 1 can serve as a stand-alone light regulating system. It may be installed in a closed cultivation space such as a greenhouse, in order to provide a more optimized illumination in a limited area. Several illumination devices 1 may be installed to cover a larger area of the cultivation space.

In a more complex example, several individually controlled illumination devices are installed and also interconnected, to enable additional opportunities for lighting control. For example, if different devices reach different light intensity levels, this indicates that the plants in the vicinity of respective device have different ChlF-gain maxima. This in turn indicates a difference in growth status, e.g. different stress level.

Figure 6:
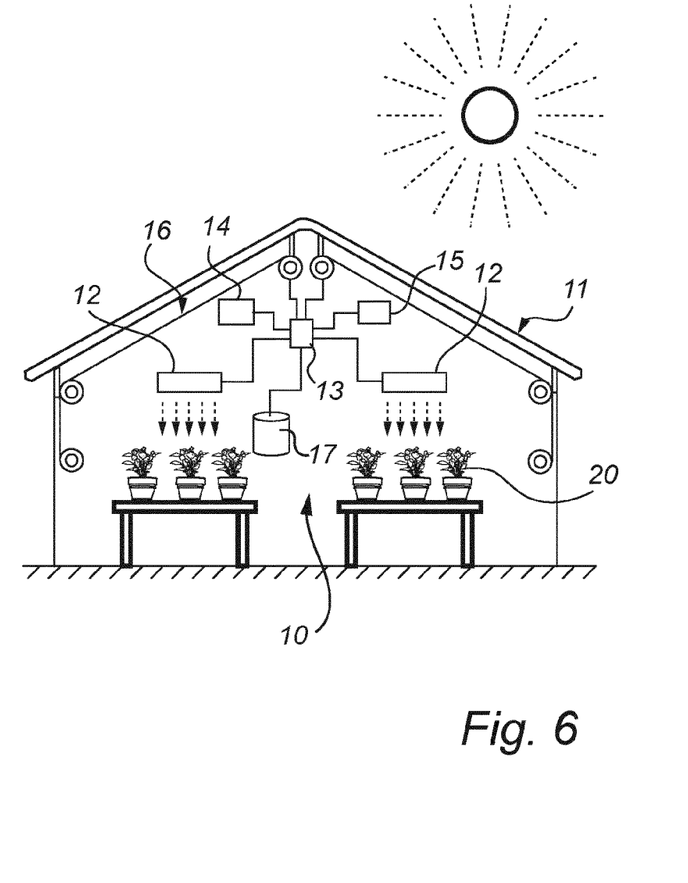
FIG. 6 is a schematic view of a cultivation space provided with a light regulating system according to an embodiment of the invention.

FIG. 6 shows an example of an even more complex light regulating system 10, including several LED modules 12 and also light blocking means in the form of curtains 16, installed in a greenhouse 11 where plants 20 are cultivated. The system further includes a controller 13 connected to each LED module 12 and each curtain 16. The controller 13 is provided with sensor signals from one or several chlorophyll fluorescence sensors 14 and optionally one or several incident light sensors 15.

It is noted that the system in FIG. 6 alternatively could include a plurality of illumination devices 1 as shown in FIG. 2, each with an individual fluorescence detector and incident light sensor. These devices 1 could then provide individual control of artificial light, and then be additionally coordinated by the controller 13.

The operation of the light regulating system is similar to the process described above with the important difference that the light intensity setpoint now includes two settings: one for the artificial light provided by the LED modules 11, and one for the curtains 16. An increase/decrease of the setpoint may thus be effected by changing one, or both, of these settings.

The light regulating system may operate as follows. In the morning, the curtains 16 are fully open, in order to allow influx of all available natural light. The LED modules 12 are active to complement the natural light, and possibly to adjust the overall spectral light distribution. The light intensity setpoint thus comprises a curtain setting ("fully open") and a LED module intensity setting.

As the sun rises, the natural light will become stronger, thereby increasing the total light intensity in the greenhouse 11 (still with the same light intensity setpoint). If the system includes a light intensity sensor 15, this increase can be measured. However, even without such a sensor, it will typically be possible to safely assume that the natural light has increased the overall light intensity.

At regular intervals, and at different lighting operating points (assumed or measured), the controller 13 uses the fluorescence sensor 14 to measure ChlF-gain, and if the ChlF-gain has decreased since the previous measurement, the light intensity setpoint can be decreased. This may be accomplished by partially closing the curtains, or by decreasing the LED module intensity setting. In a location where natural light is comparatively strong, it is likely that the curtains 16 eventually will be completely closed, and the LED modules completely shut off, in order to protect the plants 20 from too strong light.

As the sun starts to set, the opposite procedure takes place, as the overall lighting starts to decrease. During this decrease, whenever there is a decrease in ChlF-gain, the lighting setpoint is increased, either by opening the curtains more, or increasing the intensity setting of the LED modules 12. Eventually, when the contribution from the sun is no longer present, the LED modules will be controlled to provide all required light.

In some applications, the curtains 16 are not fully automated, and cannot be operated by the controller 13. In this case, the system 10 can be provided with a suitable alert function, providing an indication to an operator to manually open or close the curtains. To simplify such an operation, the curtains may be arranged to have a few preset positions, e.g. closed, 25%, 50%, 75% and fully open.

The controller 13 is preferably connected to a database 17, for storing the lighting setpoint and measured ChlF-gains over time. Such data logging offers significant opportunities for additional plant growth control.

For example, even without any light intensity sensor, the stored data will reveal if the obtainable maximum ChlF-gain has changed from one day to another. Such a change may indicate e.g. that the plant is stressed, and that a change of some controllable cultivation parameters is required. Such controllable cultivation parameters include water supply, fertilizer supply, $CO_2$ supply, humidity and temperature.

If the system also has a light intensity sensor 15, the stored data provides even more information. In this case, it is possible to track the exact lighting conditions in the greenhouse 11. For example, it becomes possible to see if the light intensity level required (or tolerated) by the plant to reach the maximum ChlF-gain changes (e.g. during a day or from one day to another). Again, such a change may indicate a need to modify some controllable cultivation parameter.

The person skilled in the art realizes that the present invention by no means is limited to the preferred embodiments described above. On the contrary, many modifications and variations are possible within the scope of the appended claims. For example, the details regarding how to move from one operating point to another can be different. The setpoint change step-size has not been discussed, but may be determined by the skilled person based on the implementation. An adaptive setpoint step-size is also possible.

What is claimed is:

1. A method for controlling a light intensity in an enclosed cultivation space for plants/crops, said enclosed cultivation space having a light regulating system including an artificial light source for emitting artificial light, the method comprising:
   at a first operating point, at which the light regulation system is operating at a light intensity setpoint, and wherein an overall light intensity in the cultivation space is at a first level:
      using the light source to at least temporarily cause an increase in intensity of artificial light, detecting an increase in fluorescence light emitted by the plants/crops as a result of the increase in intensity of artificial light, and calculating a first fluorescence gain as said increase in fluorescence light divided by said increase in intensity of artificial light;

at a second operating point, at which the overall light intensity in the cultivation space is at a second level, different from said first level:

using the light source to at least temporarily cause an increase in intensity of artificial light, detecting an increase in fluorescence light emitted by the plants/crops as a result of the increase in intensity of artificial light, and calculating a second fluorescence gain as said increase in fluorescence light divided by said increase in intensity of artificial light;

when the overall light intensity in the second operating point exceeds the overall light intensity in the first operating point, and the second fluorescence gain is greater than the first fluorescence gain, increasing the light intensity setpoint; and when the overall light intensity in the second operating point is less than the overall light intensity in the first operating point, and the second fluorescence gain is greater than the first fluorescence gain, decreasing the light intensity setpoint.

2. The method according to claim 1, wherein the second operating point is reached by changing an amount of artificial light emitted by the artificial light source.

3. The method according to claim 1, wherein the enclosed cultivation space is configured to allow an influx of natural light, so that the overall light intensity in the enclosed cultivation space includes artificial light from the light source and natural light.

4. The method according to claim 3, wherein the light regulating system includes controllable light blocking means to control the influx of natural light, and the light intensity setpoint includes a first setting for the artificial light source, and a second setting for the light blocking means.

5. The method according to claim 4, wherein the second operating point is reached by changing the influx of natural light.

6. The method according to claim 1, wherein at least one of the step of at least temporarily increasing the light intensity of the artificial light at the first operating point or the step of at least temporarily increasing the light intensity of the artificial light at the second operating point involves increasing light intensity in a specific wavelength range, wherein light in said specific wavelength range does not cause reflections in the wavelength range of the detected fluorescence.

7. The method according to claim 1, wherein at least one of the step of at least temporarily increasing the light intensity of the artificial light at the first operating point of the step of at least temporarily increasing t intensity of the artificial light at the second operating point involves adding a periodic modulation component to the artificial light, thereby causing a periodic change in fluorescence emitted by the plants/crops.

8. The method according to claim 1, further comprising:
repeating the steps of detecting first and second fluorescence gains and the steps of (i) increasing the light intensity setpoint when the overall li the second operating point exceeds the overall light intensity in the first operating point and the second fluorescence gain is greater than the first fluorescence gain, and (ii) decreasing the light intensity setpoint when the overall light intensity in the second operating point is less than the overall light intensity in the first operating point and the second fluorescence gain is greater than the first fluorescence gain, to thereby ensure a light intensity in the cultivation space at which the fluorescence gain is at a maximum value.

9. The method according to claim 8, further including:
storing previous values of a fluorescence gain maximum, assessing a growth status of the plants/crops based on a change of the fluorescence gain maximum, and
modifying at least one of a set of controllable cultivation parameters based on said growth status assessment.

10. The method according to claim 1, further comprising, in each operating point, measuring the overall light intensity in the cultivation space.

11. The method according to claim 10, further comprising:
storing previous values of measured overall light intensity when a fluorescence gain, based on said calculated first and second fluorescence gains, is at a maximum,
assessing a growth status of the plants/crops based on a change of the light intensity setpoint for which the fluorescence gain is at its maximum, and modifying at least one of a set of controllable cultivation parameters based on said growth status assessment.

12. The method according to claim 10, wherein the set of controllable cultivation parameters includes water supply, fertilizer supply, $CO_2$ supply, humidity and temperature.

13. The method according to claim 1 where the first and second fluorescence gains are modified by adding an offset or by multiplying one of the first and second gains with a factor, wherein the offset/factor depends on the measured gain, the measured fluorescence, the light intensity setpoint and/or a measured total light intensity.

14. A system for light intensity control in an enclosed cultivation space for plants/crops, comprising:
a light regulating system including an artificial light source for emitting artificial light,
a detector for detecting fluorescence light emitted from the plants/crops, and
a controller configured to control a light intensity setpoint of the light regulation system via the controller being configured to:
(i) at a first operating point, at which the light regulation system is operating at a light intensity setpoint, and wherein an overall light intensity in the cultivation space is at a first level:
use the light source to at least temporarily cause an increase in intensity of artificial light,
detect an increase in fluorescence light emitted by the plants/crops as a result of the increase in intensity of artificial light, and
calculate a first fluorescence gain as said increase in fluorescence light divided by said increase in intensity of artificial light;
(ii) at a second operating point, at which the overall light intensity in the cultivation space is at a second level, different from said first level:
use the light source to at least temporarily cause an increase in intensity of artificial light,
detect an increase in fluorescence light emitted by the plants/crops as a result of the increase in intensity of artificial light, and
calculate a second fluorescence gain as said increase in fluorescence light divided by said increase in intensity of artificial light;)

(iii) when the overall light intensity in the second operating point exceeds the overall light intensity in the first operating point, and the second fluorescence gain is greater than the first fluorescence gain, increase the light intensity setpoint; and (iv) when the overall light intensity in the second operating point is less than the overall light intensity in the first operating point, and the second fluorescence gain is greater than the first fluorescence gain, decrease the light intensity setpoint.

15. The system according to claim 14, wherein the light regulating system further includes a controllable light blocking means to control any influx of natural light into the cultivation space, and wherein the light intensity setpoint includes a first setting for the artificial light source, and a second setting for the light blocking means.

16. The system according to claim 14, wherein the light regulating system further includes a light intensity sensor, for measuring a total light intensity in the cultivation space.

* * * * *